United States Patent [19]

Bromberg

[11] 4,194,669

[45] Mar. 25, 1980

[54] METHOD OF MAKING LEADED DECORATIVE PANELS

[75] Inventor: John R. Bromberg, 15 San Roberto Way, Downsview, Ontario, Canada, M3L 2J4

[73] Assignees: John Robert Bromberg; Robert Allan Levine, both of Toronto, Canada

[21] Appl. No.: 5,141

[22] Filed: Jan. 22, 1979

[51] Int. Cl.[2] .......................... B23K 1/12; B23K 1/20

[52] U.S. Cl. .......................... 228/120; 228/140; 428/38; 428/137; 428/138; 428/433

[58] Field of Search .................. 428/38, 34, 131, 133, 428/137, 138; 228/120, 140

[56] References Cited

U.S. PATENT DOCUMENTS

| | | | |
|---|---|---|---|
| 1,524,998 | 2/1925 | Russell | 156/297 X |
| 3,293,106 | 12/1966 | Cocco et al. | 428/137 |
| 3,576,697 | 4/1971 | Lorch | 428/15 |
| 3,676,920 | 7/1972 | Pilditch | 52/747 X |
| 3,713,958 | 1/1973 | McCracken | 428/38 |
| 3,815,263 | 6/1974 | Oberwager | 428/38 X |
| 4,154,880 | 5/1979 | Drennan | 428/38 |

*Primary Examiner*—George F. Lesmes
*Assistant Examiner*—Alexander S. Thomas
*Attorney, Agent, or Firm*—Hirons, Rogers & Scott

[57] ABSTRACT

Decorative leaded panels of translucent or transparent thermoplastic material, such as windows, lampshades, or illuminated signs, are made by affixing metallic lead strips to the surface of a thermoplastic sheet by means of solderable securing means such as lead bolts, lead rivets or molten lead inserted through an aperture drilled through the lead strip and at least part way into the body of the thermoplastic sheet, and then soldering to complete the joint. The lead strip may delineate and surround portions of a decoration such as a painting applied to one surface of the thermoplastic sheet so that the finished article may have the appearance of a leaded stained glass window. An additional sheet of transparent or translucent thermoplastic may be applied to the decorated surface so as to protect the decoration.

10 Claims, 6 Drawing Figures

METHOD OF MAKING LEADED DECORATIVE PANELS

FIELD OF THE INVENTION

This invention relates to transparent or translucent decorative panels such as windows, lampshades and the like. More particularly it relates to leaded windows and methods for their manufacture.

BACKGROUND OF THE INVENTION

Leaded windows are an attractive and popular item of construction. The traditional leaded window has a large number of individual, discrete panes of glass, assembled together into a single window by means of metallic lead sub-frames. The discrete panes are actually fitted into the lead sub-frames and separated from one another by the lead sub-frames. The individual panes may be of clear or coloured glass, and may be all of the same, regular shape and colour such as diamond shaped so as to build up a lattice window. They may alternatively be of different shapes and colours, so as to build up a pattern or picture, as in the familiar church stained glass windows.

Traditional leaded windows are however expensive to construct and install. Lead itself is relatively expensive. More significant, however, is the very large amount of skilled labour which is required to construct a leaded window. Effectively, traditional leaded windows have to be constructed largely by hand, with individual panes being placed and fitted by hand within the lead sub-frame.

Nevertheless, leaded windows are still a popular and appealing item, not only for inclusion in newly constructed buildings, but also in restoration of old buildings such as cathedrals and churches. There is therefore a need to supply an economical method of making leaded windows or alternatively an economical substitute article having the outward appearance of a leaded window.

DESCRIPTION OF THE PRIOR ART

It is known and common place in practice to provide glass windows having the appearance of windows made of small discrete portions, which are in fact constituted by a single glass pane bearing wooden or the like strips on its surface, to give the appearance of sub-frames. It has not, however, previously been practical to make leaded windows in this manner, because of the difficulties experienced in securing the lead to window pane material in a sufficiently permanent, long lasting manner. A window in a building is supposed to last for many years without deterioration due to aging or weathering. To the best of my knowledge, there has been no satisfactory, previous proposal for manufacturing leaded windows cheaply and economically, on a large, production scale.

BRIEF SUMMARY OF THE INVENTION

It is an object of the present invention to provide a novel process for the manufacture of leaded transparent or translucent panels such as windows.

It is a further object of the invention to provide a novel form of leaded window.

According to one aspect of the present invention, there is provided a process of making leaded transparent or translucent panels such as windows, in which strips of lead are applied to one or more surfaces of a translucent or transparent thermoplastic sheet, such as an acrylic or polycarbonate sheet. It has been found that such lead strip can be affixed to the thermoplastic sheet in a permanent manner by a process of drilling through the lead and at least part way into the thermoplastic sheet underlying the lead strip, and then applying a solderable metallic securing means to the drilled aperture. Thereafter, the outer surface of the lead strip at the securing location is soldered, to form the finished joint. The securing means may be molten lead poured into the aperture or forced therein by a suitable applicator gun, or alternatively lead rivets or lead screws, or rivets or screws of another solderable metal composition. In a further alternative, a super heated metal pin, e.g. of steel, may be pushed through the layers of lead strip and the layers of thermoplastic sheet, bent into a hooked formation at each end in contact with the lead strips, and then soldered over with additional lead or other solderable compound, to secure and conseal the metal pin. In this means, the hole is cut into the plastic and lead by the hot metal pin instead or in addition to drilling of the apertures herein. It has been found that permanent securing of the lead to the thermoplastic may be effected by such means also; the securing means are or can be rendered visibly indistinguishable from the lead strips after application, by application of heat and/or solder to the exterior of the lead strip where the securing means has penetrated the surface.

According to a further aspect of the present invention, there is provided a translucent or transparent leaded panel comprising at least one sheet of translucent or transparent thermoplastic material, a plurality of lead strips secured to at least one major surface of the sheet, and lead securing means in the forms of lead screws, lead rivets or lead plugs from lead applied in molten form, the lead securing means extending through the lead strips and at least part way through the thermoplastic sheet underlying the lead.

Such a decorative panel can readily be made to have all the appearances of a traditional leaded window. The panels can be readily and cheaply produced on an industrial, mass production scale. The process steps simply include cutting suitably dimensioned lead strips from a rolled sheet of lead of the required thickness, then applying them in a predetermined pattern to a sheet of the thermoplastic material, then drilling at suitable locations through the lead strips and into the thermoplastic material, then applying lead securing means, then soldering. All of these steps are readily performed in an automated or semi-automated way. The thermoplastic materials which can be used are readily available and are comparatively inexpensive. Metallic lead is a notoriously difficult material to adhere to any other, different material, in a permanent manner. The method of the present invention, however, provides the necessary securing of lead strip to thermoplastic sheets for use in leaded windows and the like.

DESCRIPTION OF THE PREFERED EMBODIMENTS

One preferred embodiment of the present invention provides simulated stained glass windows. In this embodiment, therefore, decoration is applied to one surface of the thermoplastic sheet, e.g. in the form of a picture or design. Methods of decorating the surface of such thermoplastic materials are known, and include brush painting, silkscreen printing and the like. The decorated surface may be protected by applying to it, e.g. with adhesive, applied at specific locations between the sheets, another sheet of the same or a similar thermoplastic material. The lead strips may be applied in registry with the decoration so as to delineate and outline specific parts of the picture or pattern. The lead may be applied to either or both of the outer surfaces of such a laminated arrangement. In other embodiments, the second thermoplastic sheet may be omitted, and the lead strip applied to either the decorated surface, or preferably the non-decorated surface of the thermoplastic sheets, or even to both surfaces. When lead strips are applied to both surfaces of a panel according to the invention, the lead strips on one side should register with and overlie those on the second side.

In many cases, the lead strip is applied in a pattern in which one lead strip crosses over a second lead strip at various locations. In such cases, it is preferred to secure the strips to the thermoplastic sheet at the cross over locations of the strips.

It is preferred to use lead securing means, i.e. lead rivets, lead screws or molten lead, in the process of the present invention.

The securing means may if desired pass completely through the lead strips on one side of the thermoplastic at a cross over position, then completely through the or each thermoplastic panel, then completely through the lead strips at the other side of the thermoplastic, so as to make an especially strong securing means. In such an arrangement, the aperture is first drilled right through the assembly, and then the securing means in the form of molten lead is shot into the aperture and allowed to solidify therein to form a lead plug.

The present invention not only provides economical and readily manufactured leaded windows and the like, capable of being decorated in substantially any desired manner, but also provides leaded windows of greater strength and offering greater security than conventional leaded windows. The transparent or translucent thermoplastic panels are much tougher than conventional glass, in some cases so tough as to be substantially unbreakable by impact, or bullet proof. Moreover it is normally a relatively simple matter to remove an individual discrete pane from a traditional leaded window, either by breaking it or removing it from the lead subframe. As a result, access to interior locks of a house may be gained. No such risk occurs with leaded windows of the present invention, which are made of a one piece pane of very tough thermoplastic material.

The most preferred type of thermoplastic material for use in the present invention is polycarbonate. Alternative suitable materials are acrylic plastics, such a polymethylmethacrylate, polyacrylates, polyacrylic acid, etc.

The process of the present invention is not restricted to manufacture of flat items such as windows, but can be used to make other thin section, shaped leaded translucent or transparent articles. One example is illuminated signs, which may be planar, curved or three dimensional. Another example is lampshades. Tiffany-type lamp shades comprise a plurality of individual discrete coloured translucent panels, of the correct curvature, fitted together into lead sub-frames to make a complete lampshade, the shape of which constitutes a surface of revolution. Such articles can be readily made by a process according to the present invention. First the thin section thermoplastic material, as a flat sheet, is decorated, e.g. by painting or printing desired patterns thereon. Then it is molded to form the desired shape, and the edges bonded together to complete the shade. The the lead strips are applied, initially by means of adhesive, in locations to delineate the pattern as desired, and then permanently affixed by drilling and applying lead securing means as previously described. Normally lead strip is applied only to the outer surface of the lampshade. An inexpensive, strong, decorative lampshade having all the appearance features of a traditional Tiffany lamp is thus produced.

REFERENCE TO THE DRAWINGS

In the drawings, like reference numerals indicate like parts.

DESCRIPTION OF THE SPECIFIC PREFERRED EMBODIMENTS

Figure 1:
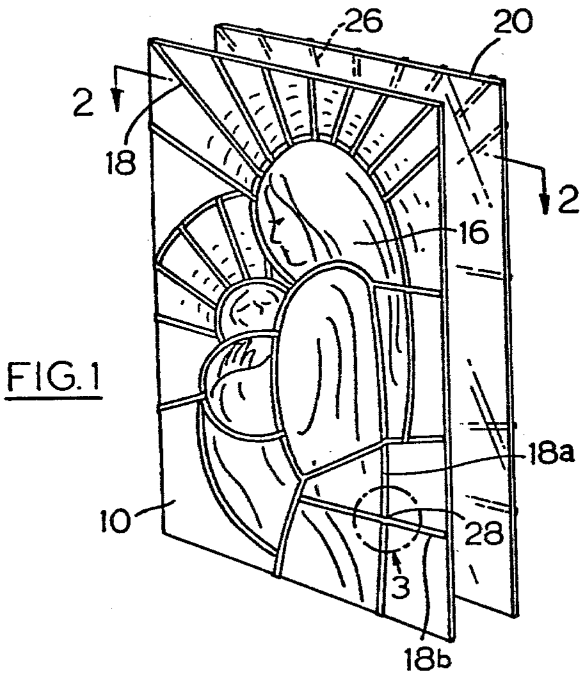
FIG. 1 is an exploded perspective view of a leaded window according to the invention.
Figure 2:
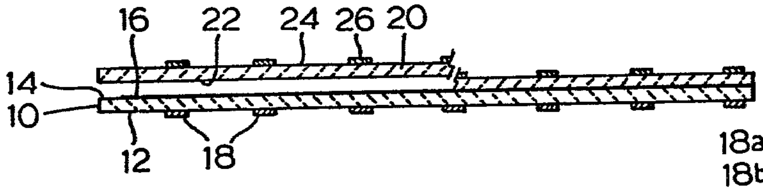
FIG. 2 is a horizontal section on the line 2—2 of FIG. 1.

With reference to FIGS. 1 and 2, a leaded window according to the present invention comprises a first sheet 10 of thermoplastic transparent material e.g. polycarbonate having an outer surface 12 and an inner surface 14. Painted decoration 16 in the form of a picture is applied to the inner surface 14. Lead strips such as 18 are applied to the outer surface 12 of the sheet 10, in predetermined position to delineate areas of the painted decoration 16 as desired.

A second sheet 20 of similar thermoplastic transparent material is laminated, e.g. by heat sealing and pressing or using clear silicone adhesive at edge locations, to the first sheet 10. The inner surface 22 is laminated in contact with the outer surface 12 of the first sheet 10, and the decoration 16 thereon. The outer surface 24 of the second sheet 20 has lead strips such as 26 affixed thereto. The strips 26 register with the strips 18 on sheet 10 so that when the finished window is viewed from the front or from behind, they overlie one another and give the appearance of a sub-frame separating individual glass panes making up a composite leaded window. At locations such as 28, strips **18*a* and 18*b* on the outer surface 12 of the first sheet 10, and strips 26*a* and 26*b* on the outer surface 24 of the second sheet 20 cross over one another, as shown in section in FIG. 3**.

Figure 3:
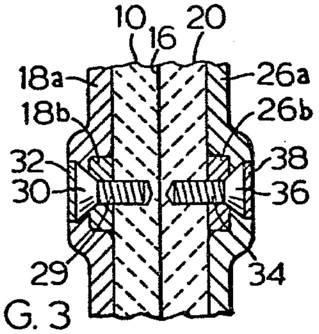
FIG. 3 is a sectional detail of the securing means of the window of FIG. 1, in the region designated 3 in FIG. 1 at an intermediate stage of manufacture.

With reference to FIG. 3, at this cross over location, a hole 29 is drilled through the top lead strip **18*a* and the bottom lead strip 18*b*, and part way into but not totally through plastic sheet 10. A lead screw 30 is screwed into the hole a substantial distance into the sheet 10, the screw 30 engaging the edges of the hole 29 in the plastic sheet 10 so as to effect necessary securing. The head of the lead screw 30 is countersunk below the exterior surface level of strip 18*a*, and a layer of lead solder 32 is applied in molten form over the head of screw 30**.

For securing lead strips **26*a*, 26*b* to the outer surface 24 of the plastic sheet 20, an exactly similar method and arrangement is used, comprising a hole 34**, a lead screw 36 secured therein, and a covering lead solder layer 38 over the screw head.

Figure 4:
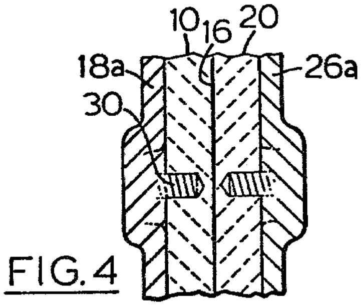
FIG. 4 is a view similar to FIG. 3, showing the securing means after soldering.

The application of lead solder in molten form over the head of screw 30, i.e. heat soldering, causes the two lead strips 18*a*, 18*b* and the head of screw 30 to coalesce into a unitary mass of lead 39, at the vicinity of the joint, the shank of screw 30 being unitary with the mass 39, so as to complete the securing of the lead strips to the thermoplastic. This is shown in FIG. 4. The outward appearance of the lead strips is now uniform.

Figure 5:
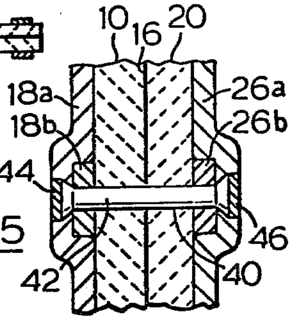
FIG. 5 is a sectional detail similar to FIG. 3, but showing an alternative securing means.

An alternative securing means is illustrated in FIG. 5. In this embodiment, a hole 40 is drilled through both lead strips 18*a*, 18*b* on the outer surface of panel 10, through panels 10, 20 and through lead strips 26*a*, 26*b* on the outer surface of panel 20. Then hole 40 is filled with molten lead from a suitable gun-type applicator. The lead solidifies to form a solid plug 42 of lead, bonded to the panels 10, 20 and the lead strips to secure the assembly together. After assembly and solidification of the plug 42, further pieces of surfacing lead 44, 46 are added e.g. by soldering, to make the outer lead surfaces continuous and to coalesce the parts of the securing means into a solid mass of the type shown in FIG. 4. Such an arrangement is particularly useful on windows of large size.

Figure 6:
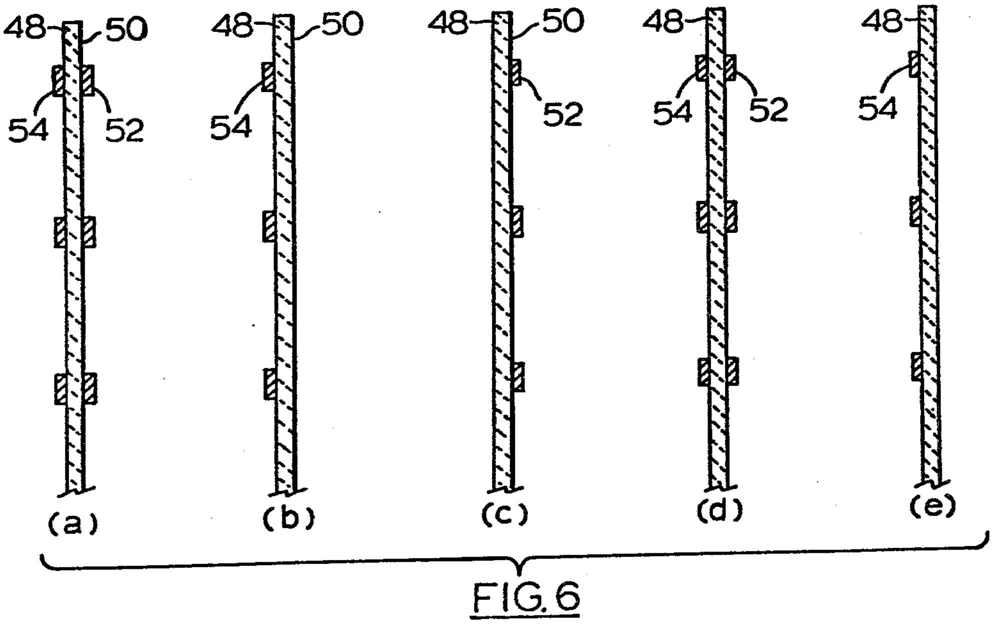
FIG. 6 shows in section various embodiments of windows according to the invention.

A variety of alternative embodiments of windows according to the invention are shown in FIG. 6. In each case, a single transparent thermoplastic panel 48 is used as a window. In the version shown in FIG. 6*a*, decoration 50 is applied to one surface of the panel 48, with lead strips 52 applied to the decorated surface and lead strips 54 applied to the other surface, in registry with one another. In the embodiment of FIG. 6*b*, the panel 48 has decoration 50 on one surface, and lead strips 54 on the other surface only. In the embodiment of FIG. 6*c*, lead strips 52 are applied over the decoration 50 on one surface only of the panel 48. The embodiments of FIGS. 6*d* and 6*c* omit the decorative layer, the panel 48 having lead strips 54 and 52 on both sides (FIG. 6*d*) or having lead strips 54 on one side only (FIG. 6*c*). In all of these embodiments, the lead strips may cross over one another, and are secured to the panel 48 by a method as previously described, at or remote from the cross over locations.

It will be appreciated that the method of the invention is readily adaptable to industrial production of leaded windows as described. A large number of substantially identical windows can be made, having the same decorated pattern or picture applied thereto. A standard lead cutter can be assembled and used to press lead strips from a lead sheet of the desired thickness, in a predetermined standard pattern for application to the panel containing the standard picture. Then the lead can be attached to the panel as described. Alternatively, individual strips can be cut and laid automatically or by hand in the required locations around the picture, and then affixed. In either case, it is desirable that the lead strips bear on one surface a pressure sensitive adhesive so that they can be temporarily positioned on the thermoplastic panel surface at the correct locations, and then permanently affixed as described.

It will be further appreciated that the embodiments described and illustrated herein are illustrative only, the scope of the invention being limited only by the scope of the appended claims.

What I claim is:

1. A process of making leaded transparent or translucent panels such as windows, which comprises:

applying a strip of metallic lead to a major surface of a sheet of transparent or translucent thermoplastic material;

forming a hole through the lead strip and at least part way into the thermoplastic sheet underlying the lead strip;

securing the lead strip to the thermoplastic sheet by applying solderable metallic securing means through the hole in said lead strip and into the hole in the thermoplastic sheet underlying the lead strip;

soldering the securing means to the lead strip by applying heat and a molten lead containing soldering compound to the exterior surface of the lead strip and securing means.

2. The process of claim 1 wherein the securing means is selected from the group consisting of lead screws, lead rivets and molten lead inserts.

3. The process of claim 2 wherein lead strips are affixed to both major surfaces of the thermoplastic sheet, the strips on the first major surface being in registry with the strips on the second major surface.

4. The process of claim 1 wherein the lead strip is applied to the thermoplastic surface initially by means of adhesive.

5. The process of claim 4 wherein a plurality of lead strips are applied to the thermoplastic sheet surface, crossing over one another and overlying one another at cross-over locations, the lead strips being affixed to the thermoplastic sheet by cutting a hole through the lead strips and at least part way into the underlying thermoplastic sheet at the cross-over location, and thereafter applying said metallic lead securing means.

6. The process of claim 4 including a first step of applying decoration to one surface of the thermoplastic sheet and then applying said metallic lead strip in predetermined registration to the decoration applied to the sheet.

7. The process of claim 6 wherein the decoration is applied to a first major surface of the sheet and the lead strip is affixed to a second major surface thereof.

8. The process of claim 7 comprising the steps of applying decoration to a first major surface of a first thermoplastic sheet, adhesively applying a second similar thermoplastic sheet to said first major surface so as to overlie said decoration, and affixing lead strip to the second major surface of the first thermoplastic sheet in predetermined registration to the decoration.

9. The process of claim 7 wherein lead strips are affixed to both the outer major surface of the first thermoplastic sheet and the outer major surface of the second thermoplastic sheet, the strips on the respective surfaces being in registry with one another.

10. The process of claim 9 wherein the lead strips are affixed by cutting holes in a direction normal to the plane of the thermoplastic sheets, through lead strip applied to the outer major surface of the first thermoplastic sheet, through the first thermoplastic sheet, through the second thermoplastic sheet and through lead strip applied to the outer major surface of the second similar plastic sheet, and applying metallic lead securing means in said hole.

* * * * *